United States Patent
Einola

(10) Patent No.: US 6,434,393 B1
(45) Date of Patent: Aug. 13, 2002

(54) MEDIUM PENETRATION CALL ANNOUNCEMENT IN TELECOMMUNICATIONS SYSTEM

(75) Inventor: Heikki Einola, Helsinki (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/341,103

(22) PCT Filed: Jan. 2, 1998

(86) PCT No.: PCT/FI98/00005

§ 371 (c)(1),
(2), (4) Date: Jul. 2, 1999

(87) PCT Pub. No.: WO98/31165

PCT Pub. Date: Jul. 16, 1998

(30) Foreign Application Priority Data

Jan. 7, 1997 (FI) .................................................. 970074

(51) Int. Cl.[7] .................................................. H04Q 7/20
(52) U.S. Cl. ........................ 455/458; 455/433; 455/466
(58) Field of Search ................................ 455/466, 433, 455/313, 458, 518, 519, 422, 12.1, 432, 461, 522; 540/7.2, 7.22

(56) References Cited

U.S. PATENT DOCUMENTS

| | | | |
|---|---|---|---|
| 4,661,972 A | * 4/1987 | Kai | 340/7.21 |
| 5,175,758 A | * 12/1992 | Levanto et al. | 455/458 |
| 5,392,452 A | * 2/1995 | Davis | 340/7.3 |
| 5,465,391 A | 11/1995 | Toyryla | 455/422 |
| 5,594,776 A | * 1/1997 | Dent | 455/458 |
| 5,689,568 A | * 11/1997 | Laborde | 380/49 |
| 5,815,808 A | * 9/1998 | Valentine | 455/422 |
| 5,884,170 A | * 3/1999 | Valentine et al. | 455/433 |
| 5,933,763 A | * 8/1999 | Wang et al. | 340/7.2 |
| 6,046,990 A | * 4/2000 | Chennakeshu et al. | 370/317 |
| 6,088,589 A | * 7/2000 | Valentine et al. | 455/433 |

FOREIGN PATENT DOCUMENTS

| | | | |
|---|---|---|---|
| GB | 2 253 972 | | 9/1992 |
| GB | 2253972 | * | 9/1992 |
| WO | 94/28689 | | 12/1994 |
| WO | 96/08941 | | 3/1996 |
| WO | 96/21332 | * | 7/1996 |
| WO | 98/11743 | | 3/1998 |
| WO | 98/13954 | | 4/1998 |

* cited by examiner

*Primary Examiner*—Dwayne Bost
*Assistant Examiner*—Joy K. Contee
(74) *Attorney, Agent, or Firm*—Pillsbury Winthrop LLP

(57) ABSTRACT

The claimed invention relates to a radio telecommunications system using channels with high penetration capacity. When a user terminal enters a shadowed area, the user terminal starts listening to a paging channel allocated for transmission of a high-penetration paging message. The subscriber thereby remains with reach of teleservices not otherwise provided for.

9 Claims, 5 Drawing Sheets

MEDIUM PENETRATION CALL ANNOUNCEMENT IN TELECOMMUNICATIONS SYSTEM

This application is the national phase of international application PCT/FI98/00005 filed Jan. 2, 1998 which designated the U.S.

FIELD OF THE INVENTION

The invention relates to telecommunications systems and particularly to an arrangement for passing a message to a user terminal located in a shadow region in a telecommunications system based on a radio connection.

BACKGROUND OF THE INVENTION

Mobile systems enable subscribers to move within the working range of a network so that they remain within the reach of teleservices. The working range of a mobile system consists of cells provided by base stations. A mobile station functioning as a user terminal, a radio system comprising base stations and base station controllers that control them, and a system of mobile switching centres monitor the movements of a subscriber so that the subscriber can move freely from one cell in the working range to another without needing to know in the area of which cell he currently is.

However, matters affecting propagation of radio waves, such as attenuation, reflection, etc., provide shadow regions in the working range; in shadow regions, the network connection weakens significantly or disappears altogether. A shadow region may result from a temporary obstacle in the propagation direction of a radio wave or from a permanent obstacle, such as a steep wall or a multi-storey building, stopping the propagation of the radio waves. Shadow regions are problematic to all telecommunication on the radio path.

The problem becomes particularly apparent in satellite mobile systems, in which the whole globe can be covered by a rather small number of satellites thanks to the large cell size. Because of the frequencies and transmission powers used, however, a satellite mobile system in practice covers only outdoor areas; in other words, when a user moves inside or e.g. under a roof, the network connection weakens significantly or disappears altogether. This greatly impairs the operability of a satellite mobile system.

The GSM system (Global System for Mobile Communications) comprises a Short Message Service SMS facilitating the reaching of a subscriber: a message to a subscriber that is not reached can be forwarded to the user terminal in packet form immediately as the system detects that the subscriber can be reached. A short message can be supplied to a subscriber always when the subscriber is registered in the network, i.e. even when the subscriber is participating in a call. A short message is usually associated with conditional call forwarding and a voice message so that if a call to a subscriber cannot be successfully set up, the calling party can leave a voice message for the subscriber concerned. The storage of a voice message in the system generates a short message from the short message service centre, whereby the subscriber is notified in the above manner of the call attempt immediately as he registers in the network.

Successful forwarding of a short message, however, also requires a network connection with the user terminal. A subscriber located in a shadow region cannot thus receive information indicating whether the system has attempted to reach him. An essential improvement in the reachability of a subscriber in mobile systems would be a paging message type notification that would reach the subscriber that the mobile system is attempting to reach in a shadow region, for example in connection with call set-up.

BRIEF DESCRIPTION OF THE INVENTION

The object of the present invention is to provide a service that significantly improves the possibility of supplying a message to a user terminal when the subscriber is located in a shadow region. The aim of the service is that after receiving the message, the subscriber can—is he so desires—move to an area where the network connection is better or he can attempt to receive the message in some other way. In particular, the invention provides a network level solution to forwarding a message to a subscriber in a mobile system. The probability of the data reaching the destination is called penetration capacity.

The invention is characterized in that the arrangement comprises at least one high penetration paging channel, the penetration capacity of a transmission on the channel being arranged to be essentially higher than on the other channels of the telecommunications system; and equipment, responsive to a failed attempt to reach the user terminal on a normal paging channel of the telecommunications system, for issuing and transmitting a message with high penetration capacity on said at least one high penetration paging channel.

The invention also relates to a user terminal which is characterized in that the user terminal, in response to moving to a shadow region, starts to listen to a paging channel allocated for transmission of a paging message with high penetration capacity, and that the user terminal, in response to reception of the high penetration paging message, indicates the reception of said message by indicators arranged in the user terminal.

The invention also relates to a method of supplying a message to a user terminal located in a shadow region in a telecommunications system based on a radio connection. The method is characterized by comprising the steps of unsuccessfully paging the user terminal on a normal paging channel of the telecommunications system, and sending said user terminal a high penetration message on at least one high penetration paging channel, the penetration capacity of a transmission on the channel being much higher than on the other channels of the telecommunications system.

The invention is based on the idea of arranging in the mobile system at least one channel which gives the signal burst transmitted a better chance of reaching the user terminal despite attenuation. When the user terminal detects that it is in a shadow region, it proceeds to listen to a channel allocated for a high penetration paging message. When the system attempts to reach a subscriber but the attempts by normal network arrangements are unsuccessful, a high penetration paging message is issued and transmitted to the subscriber on said channel. After receiving the message, the subscriber can move away from the shadow region and contact the system.

To implement the service, a separate service centre associated with a high penetration paging message is added to the mobile system, the service centre being essentially an administrative database. When the paging of a subscriber is unsuccessful, the functional unit of the mobile system responsible for call set-up and mobility management, e.g. a mobile exchange, forwards information about the failed paging to the service centre. In the service centre is issued a paging message, and the message is forwarded by a high penetration signal burst to the user terminal in the system.

Indication of a call attempt to a subscriber located in a shadow region is a major problem in all telecommunication on the radio path. The present invention is suitable for use in analogue and digital mobile networks and in packet systems. It significantly improves the reachability of a subscriber in a mobile system and thereby essentially improves the known technology. In addition, an improvement in the reachability of user terminals also makes them more useful as paging devices, so that the subscriber does not necessarily need two separate devices: one for paging and the other for telephone services. The solution of the invention is suitable for use in all telecommunications networks based on a radio connection.

BRIEF DESCRIPTION OF THE FIGURES

In the following the invention will be described in greater detail with reference to the attached drawings, in which.

DETAILED DESCRIPTION OF THE INVENTION

In the following the invention is described in connection with a satellite mobile system using names established in the GSM specifications for the operationally corresponding parts of the system. The invention, however, is not limited to these systems or by these names. With regard to a more detailed description of the infrastructure of a GSM system, reference is made e.g. to the GSM standard and to M. Mouly and M. Pautet, The *GSM System for Mobile Communications*, Palaiseau, France, 1992, ISBN:2-9507190-0-0-7.

The solution of the invention can be utilized in all telecommunications systems, such as mobile networks, paging networks and packet networks, provided that the functionalities described below can be implemented by the network elements of the system.

In the near future, several mobile systems based on a satellite connection will be introduced. In a satellite mobile system, radio coverage is provided by means of satellites revolving around the earth, the satellites transmitting radio signals between User Terminals UT and Satellite Earth Stations SES in the same way as base stations. A beam provided by one satellite defines a coverage area, or cell, of a mobile system on the earth. The cells defined by satellites are arranged to form a continuous coverage area, whereby a mobile station is always within a coverage area. Since a satellite mobile network has a large cell size, a whole country can, in principle, be covered by about ten satellites.

Subscriber mobility requires largely similar solutions in satellite mobile systems as in standard Public Land Mobile Networks PLMN, i.e. management of subscriber data of mobile subscribers, authentication, location management, handover, etc. The subscribers of satellite systems are also to be offered services offered in PLMN networks. One can anticipate solutions in which a user terminal operates in more than one network and the subscriber moves from one network to another using the facilities of different networks transparently.

Recent developments in satellite mobile systems have concentrated on the use of existing PLMS network solutions, especially the infrastructure of for example a GSM network. Accordingly, the system of satellite mobile switching centres typically corresponds to the infrastructure of a PLMN network, and the radio system is defined to be specific to a satellite system. In principle, the same network infrastructure could comprise both standard PLMN base stations and 'satellite base stations' based on a satellite connection, the two types of base stations differing from one another with respect to a radio interface.

Figure 1:
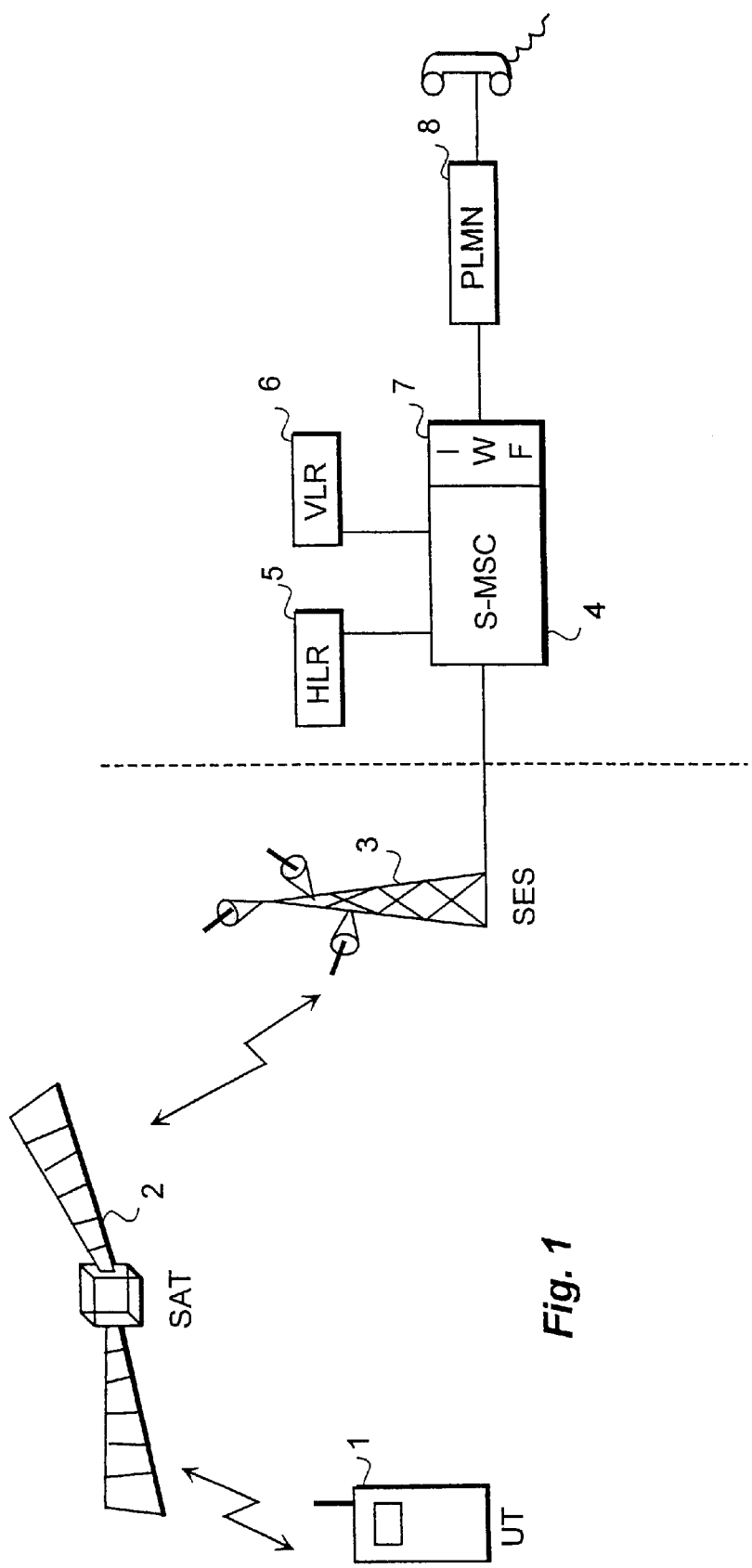
FIG. 1 is a block diagram illustrating the structural components of a satellite mobile system that are essential to the invention.

The block diagram of FIG. 1 illustrates the basic components of a satellite mobile system. For the sake of simplicity, each component is shown in the figure only once. Different functional units are presented as different blocks, but this is not to be regarded as a definition of the physical positioning of the units in the satellite system.

A Satellite Mobile Switching Centre S-MSC performs similar functions concerning call set-up and management of mobile traffic as a corresponding mobile switching centre MSC in a PLMN system. A satellite mobile switching centre is usually connected to a public land mobile network via an Inter Working Function IWF.

A Home Location Register HLR 5 of a satellite mobile system stores and transmits, similarly as in PLMN networks, permanent subscriber data and varying data associated with subscriber mobility, such as data on the network address and reachability of the user terminal.

A Visitor Location Register VLR 6 is responsible for the registration of a subscriber, and it checks and stores the subscriber data for as long as the subscriber is within the area of a switching centre S-MSC served by the visitor location register VLR.

The base station system of a satellite mobile system comprises satellite earth stations SES functioning as base station controllers and satellites SAT 2 functioning as base stations in orbit round the earth. For the sake of clarity, FIG. 1 shows only one satellite earth station SES 3 and one satellite SAT 2. In practice, the base station system comprises a plural number of satellites, each satellite SAT 2 being in contact, in succession, with different terrestrial earth stations SES 3 or with another satellite. The orbits of the satellites are designed so that a user terminal UT 1 is always within the area of at least one satellite SAT 2 and each satellite SAT 2 is always in contact with at least one earth station SES 3.

A satellite earth station SES 3 preferably comprises a plural number of antennas and is responsible for the RF and baseband processing needed in controlling a satellite connection as well as for call control functions. The SES 3 is responsible for timing associated with the radio interface and also for routing as regards the satellite system. A user terminal UT 1 is connected with the system via a radio interface between a satellite SAT 2 and the user terminal UT 1.

In satellite systems, the terrestrial network can comprise a plural number of interconnected Satellite Access Nodes SAN, which are also connected to a Network Management Centre NMC, Operation Management Centre OMC and to a functionally centralized group of databases (AuC, EIR) used in mobility management and safety control. A satellite access node typically comprises an earth station, a satellite mobile switching centre and a visitor location register. The more detailed implementation of the components of a satellite mobile system and the location of the components in relation to one another in the network are not essential to the invention; with regard to them, as well as the more detailed operation of the other basic components of the satellite system, reference is made to the ETSI specification ETR 093, 'Satellite Earth Stations (SES); Possible European Standardisation of Certain Aspects of Satellite Personal Communications Networks (S-PCN), Phase 1 Report,' UDC 621.396.946.

Figure 2:
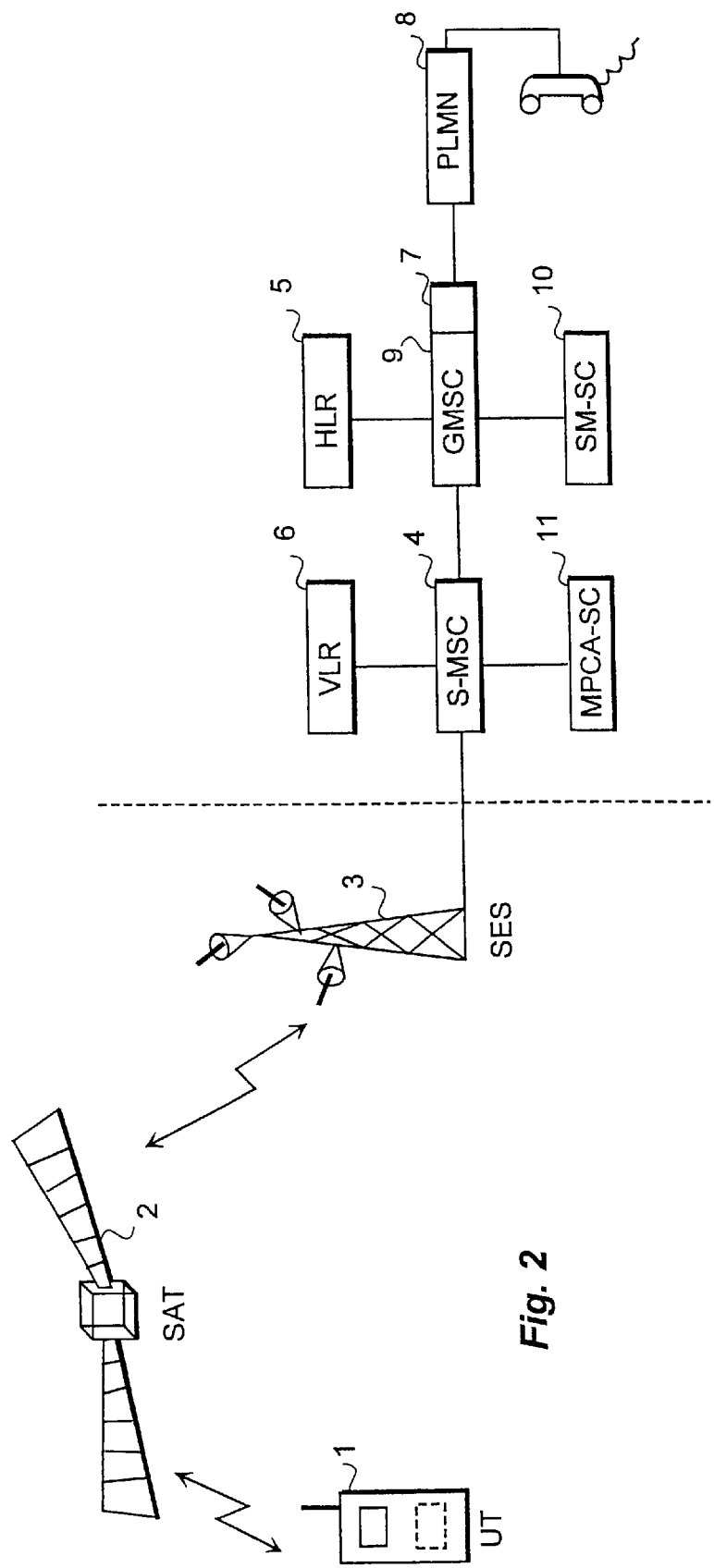
FIG. 2 is a block diagram illustrating an arrangement according to the invention in a satellite mobile system.

The block diagram of FIG. 2 illustrates an arrangement according to the invention in a satellite mobile system, but the invention, however, is not limited to this. As compared with FIG. 1, a gateway mobile switching centre GMSC 9 has been added to FIG. 2; through the switching centre, calls from other networks are conducted to the mobile network. The GMSC 9 controls a short message switching centre SMS-SC 10, which is a database associated with short message service and through which short messages pass and in which they can be stored for later transmission if the receiver is not reached. In the example of FIG. 2, the GMSC 9 of the mobile system also functions as a gateway mobile switching centre for the short message switching centre SMS-SC 10. The satellite mobile switching centre S-MSC 4 controls a paging centre MPCA-SC 11, which is a database associated with implementation of a high penetration paging message and largely corresponds to a short message switching centre.

When the subscriber moves to the area of a satellite mobile switching centre S-MSC 4, the user terminal UT 1 performs location updating, whereby the visitor location register VLR 6 registers the subscriber that has entered the area of the switching centre served by the register, notifies the home location register HLR 5 of the location, i.e. network address, of the subscriber, and e.g. updates the subscriber data stored in the home location register HLR 5 to the visitor location register VLR 6.

A call from another network is first switched to the gateway GMSC 9, which routes the call, by means of the address of the visitor location register VLR 6 given by the home location register HLR 5, to the satellite mobile switching centre S-MSC 4 in the area of which the subscriber is located. The satellite mobile switching centre S-MSC 4 inquires the subscriber data needed of the visitor location register VLR 6 and requests the earth station SES 3 to page the user terminal UT 1.

If the user terminal UT 1 is within the coverage area of the network, the user terminal responds to the paging, and normal call set-up can continue. If the user terminal UT 1 is in a shadow region, no response is obtained. In satellite mobile systems, like in other mobile systems, paging is first conducted in the switching centre the address of the visitor location register VLR 6 of which is registered in the home location register HLR 5, i.e. in the cell where the subscriber has last performed location updating. If the user terminal is not reached in the area, paging will be extended to other areas in accordance with a system-specific definition. If the user terminal is not reached, the switching centre S-MSC 4 will be informed that the paging has failed.

In the following, the series of functions needed for transmitting a high penetration paging message to a user terminal will be called an MPCA service (Medium Penetration Call Announcement). In a first embodiment of the invention, the MPCA service is an additional function of a satellite system, associated with a short message service SMS according to the GSM specification. Accordingly, the MPCA service is triggered by a failed SMS function. With regard to a more detailed definition of a short message service, reference is made to GSM specification 03.40. The function starting the MPCA service can also be some other function: for example, the MPCA service can be started directly in connection with normal call set-up when the paging has failed. The MPCA service is not essentially interactive with the unit that triggers it, so the trigger element is not essential to the invention but can be selected specifically for each application.

The use of a short message service as a trigger function, however, also links the MPCA service with failed call set-up. If the subscriber has activated conditional call forwarding to a Voice Mail System and the paging of the user terminal has failed in connection with standard call set-up, then the calling party can leave a message in the voice mail system, which typically activates transmission of a short message from the short message switching centre SMSC 10. If the paging also fails in connection with the short message service, then the MPCA service is started in accordance with the invention.

The MPCA service is an effective paging function that uses more transmission capacity of a satellite than normal message transmission in the system does. To save resources, the activation of the MPCA service is preferably preceded by the use of other, simpler paging and alert functions. The use of a failed short message service as a facility preceding the MPCA service meets the requirement and yet it triggers the service with an acceptable delay even in connection with, for example, failed call set-up.

Figure 3:
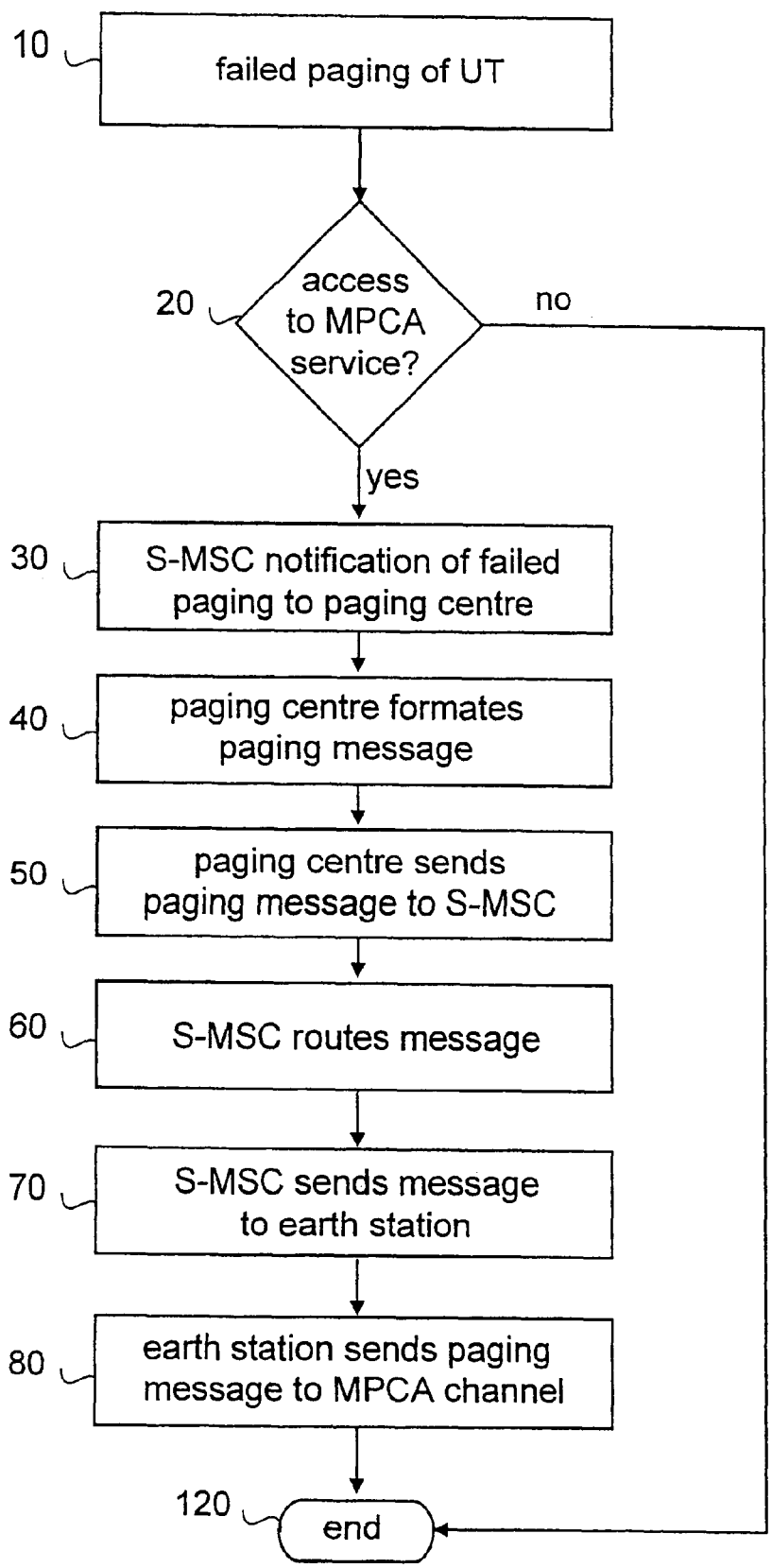
FIG. 3 is a block diagram and FIG. 4 a corresponding signalling diagram illustrating basic implementation of a high penetration paging service.
Figure 4:
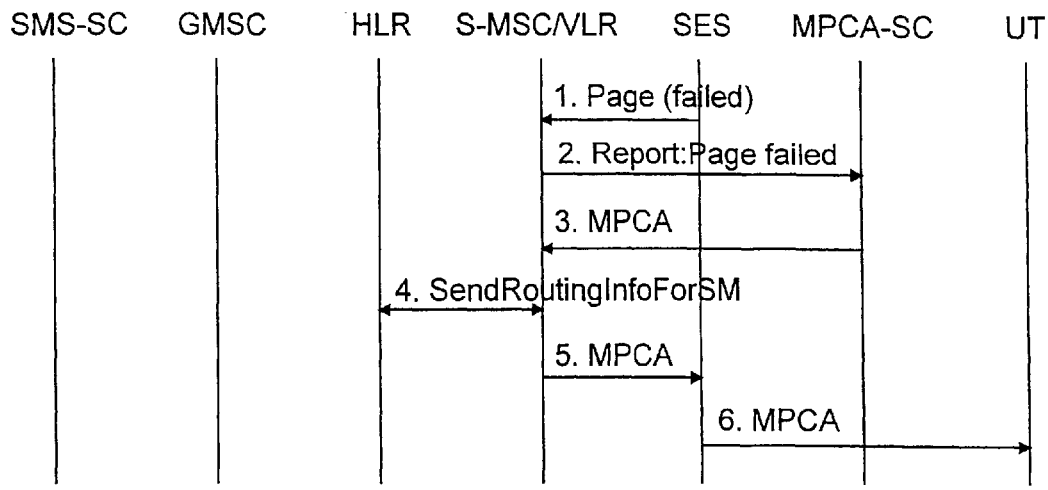

FIG. 3 is a block diagram of a basic implementation of the MPCA service and FIG. 4 is a signalling diagram corresponding to the basic implementation. In block 10 the satellite mobile switching centre S-MSC receives a notification, in connection with a short message, reporting that the paging of the user terminal 1 has failed. The GMSC 9 checks from the visitor location register VLR 6 (block 20) whether the subscriber is authorized to use the MPCA service. If the subscriber does not have access to the MPCA service, the system will wait for the next location updating of the user terminal 1 and forward the short message quite normally after the user terminal UT 1 has re-registered in the network.

If the switching centre S-MSC 4 detects that the subscriber is authorized to use the MPCA service, it activates the MPCA service by transmitting a message about the failing of the paging to the paging centre MPCA-SC (block 30). The message can be, for example, an actual short message that could not be forwarded to the subscriber when the subscriber was in the shadow region, but the form and content of the message can be selected specifically for each application. The essential feature is that the message identifies the subscriber to which the high penetration paging message is addressed.

The reception of the message in the paging centre 11 initiates formatting of the high penetration paging message (block 40). The content of the message is an application-specific solution and is dependent on the system solution. The message is preferably a short queue of characters that is shown on the display of the user terminal UT 1. If similar functionality is added to the user terminal UT 1, the MPCA message can be a simple standard signal the reception of which makes the user terminal UT 1 display a corresponding message or symbol stored in the memory of the user terminal UT. A paging message can be indicated either by a tone or by vibration of the user terminal, depending on the selection of indicators arranged in the user terminal.

The paging centre MPCA-SC 11 sends the formatted MPCA message to the satellite mobile switching centre S-MSC 4 (block 50). The switching centre S-MSC 4 requests the subscriber data (e.g. IMSI, TMSI, subscriber location) from the visitor location register VLR 6 for the satellite earth station SES 3 (block 60) and sends the message to the satellite earth station SES (block 70). The earth station SES 3 routes the message and times the transmission (frequency, time slot). The earth station SES 3 conducts the transmission of the MPCA message to that beam of the satellite in which the user terminal is assumed to be located and triggers the transmission of the MPCA message (block 80).

In the arrangement of the invention, at least one channel is allocated for the transmission of the MPCA message, and the user terminal UT 1, after detecting that it has entered a shadow region, proceeds to listen to the channel concerned. When the user terminal UT 1 moves away from the shadow region, it stops the listening of the MPCA channel and starts to operate again within the normal network connection. An MPCA message is preferably sent via a single burst of a signalling channel whose penetration capacity has been arranged to be higher than what is normal. The arrangement of channels for the transmission of the MPCA message is specific for each system and application.

The probability of a signal reaching its destination in a digital system can be raised in various ways, according to the multiple access interface selected. One way is to increase the transmission power of a signal directed to a destination, whereby the probability of the signal reaching its destination in spite of attenuation will rise. In Time Division Multiple Access TDMA, the probability can also be raised by adding channel coding to the system, i.e. functions by which the signal is protected against data transmission errors. If the exact location of the subscriber is known, the penetration capacity can be raised by directing the antenna. The method of improving the penetration capacity of the signal is selected specifically for each application and, as regards the implementation, it is obvious to a person skilled in the art.

The signalling associated with the series of functions is illustrated in FIG. 4. It should be noted that the signals shown in the figure concern the example illustrated without limiting the invention to the selections made. Step 1 in FIG. 4 corresponds to block 10 in FIG. 3, i.e. the earth station SES 3 notifies the switching centre S-MSC 4 that the subscriber has not been reached, i.e. the paging has failed. The switching centre S-MSC 4 checks the subscriber's authorization to use the paging service, and if the subscriber has access to the service, the switching centre S-MSC 4 reports the failing of the paging to the paging centre MPCA-SC 11. The report message (step 2) is specific for each application; at its simplest form it can be, for example, the MSISDN number of the subscriber. After receiving the report, the paging centre MPCA-SC 11 issues a paging message and sends it to the switching centre S-MSC 4 (step 3). The switching centre S-MSC 4 conducts a routing inquiry e.g. on the basis of a short message routing inquiry (MAP/C SendRoutingInfoForShortMessage) (step 4), adds routing data to the paging message and sends the message to the earth station SES 3 (step 5). The earth station SES 3 times and routes the message to the satellite system and sends the message to the user terminal UT (step 6).

Above is described the basic form of an MPCA service, which comprises transmission of a single message destined to a single user terminal UT 1. In the basic form, the paging service utilizing a high penetration paging message functions directly as a continuation of a short message service, and the paging centre MPCA-SC 11 does not know whether or not the subscriber has received the paging message. To improve service, it is possible to define a retransmission strategy in the system, which means that the transmission of the paging message is repeated to improve reachability. Since the transmission of a high penetration signal uses much transmission capacity as compared with a normal transmission, the retransmission strategy of the arrangement must be designed carefully to be a compromise between the desired quality of service and the transmission capacity available.

The retransmission strategy of a paging message can be based on a retransmission strategy of a short message switching centre that starts the paging service. If the retransmission of the paging message is based, for example, on prioritized retransmissions from a short message switching centre sent at predefined intervals, and if the predefined interval is sensible to the retransmissions of the MPCA service, then the paging switching centre MPCA-SC 11 can be defined to regard each failed short message transmission attempt as a new command to send a paging message, i.e. to implement the series of functions illustrated by the block diagram of FIG. 3 without any separate checks.

If, considering the transmission capacity available, the retransmissions from the short message switching centre SMS-SC 10 occur too frequently to be used as a basis for MPCA retransmissions, then it is possible to add to the paging centre MPCA-SC 11 a check that controls the retransmission of a paging message. Such a check could be, for example, a function in which the paging centre MPCA-SC 11 checks the received MSISDN number of the subscriber associated with the failed paging, before it issues a paging message. If the paging centre detects that a paging message associated with the same MSISDN number has been transmitted within a predefined period of time, then the paging centre will not continue the MPCA service. When the time limit is exceeded, the paging message will be sent in the manner described above.

Figure 6:
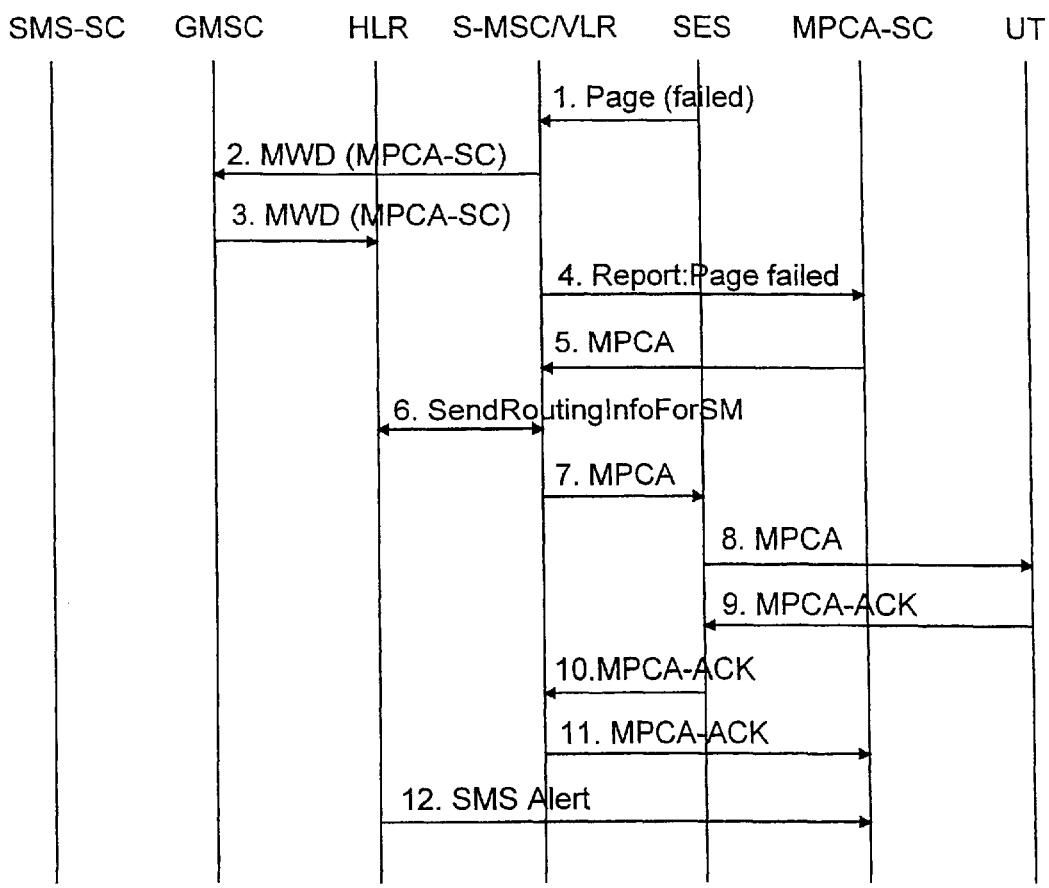
Figure 5:
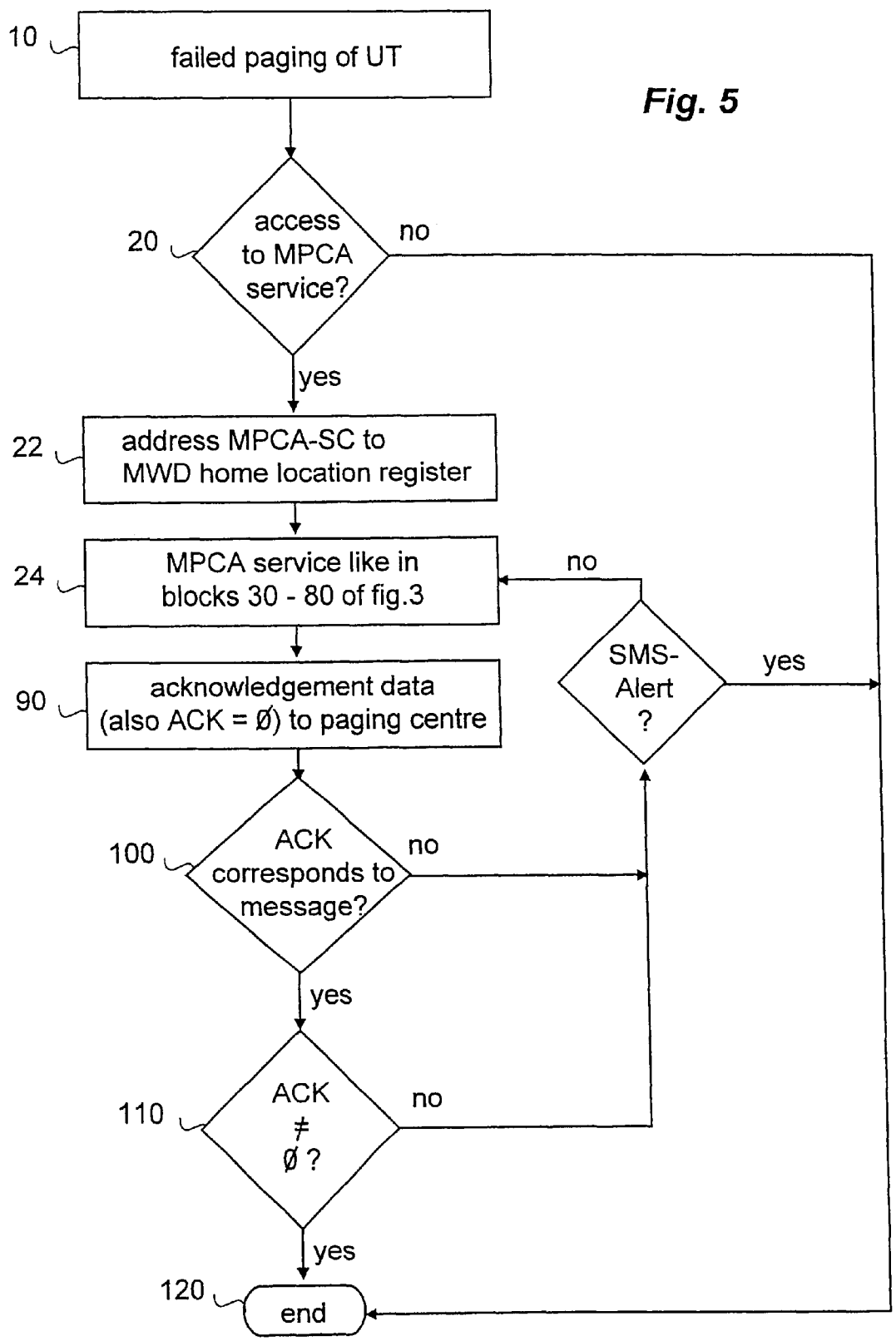
FIG. 5 is a block diagram and FIG. 6 a corresponding signalling diagram illustrating implementation of a high penetration paging service in a situation where the retransmission of a paging message is controlled on the basis of signals obtained from a paging device.

FIG. 5 is a flowchart of the MPCA service, and FIG. 6 is a corresponding signalling diagram of an application in which control functions associated with the retransmission of a message are added to the MPCA service. To control the retransmission of the MPCA message in the application described, the system comprises an acknowledgement function, and a short message service alert message SMS-Alert defined in the GSM system is utilized in the strategy.

After a failed paging, the satellite mobile switching centre S-MSC 4 checks, in connection with the short message service, the subscriber's authorization to use the MPCA service (block 20). If the subscriber has access to the service, the switching centre S-MSC 4 sends the GMSC 9 a message indicating that the paging of the subscriber has failed, whereby the GMSC 9 sets Message Waiting Data MWD in the home location register HLR 6, the data containing the address (block 22) of the service centre MPCA-SC 11. The data guides the home location register HLR 6 to send the GMSC 9 a notification (SMS-Alert) to be transmitted to the service centre MPCA-SC 11 concerning the reachability of the user immediately as the user terminal UT 1 registers in the network in connection with location updating.

After the transmission of the MPCA message (block 24), the earth station SES 3 waits for an acknowledgement from the user terminal UT 1. If the user terminal UT 1 receives the message, it issues and sends an acknowledgement via a predefined signalling channel. The received acknowledgement data, i.e. an acknowledgement from the user terminal UT 1 or a notification indicating that the user terminal UT 1 has not sent an acknowledgement, is sent via the satellite mobile switching centre S-MSC 4 to the service centre MPCA-SC 11 (block 90). In the service centre MPCA-SC 11, the received acknowledgement data is compared with the messages transmitted. If the acknowledgement data relates to a message sent by the service centre MPCA-SC 11 and if the user terminal has acknowledged the message (MPC-ACK≠0), then the MPCA service is terminated. If the user terminal UT 1 has not acknowledged the message (MPC-ACK=0) or if the acknowledgement data cannot be associated with any message sent by the paging centre MPCA-SC 11, then the service centre MPCA-SC 11 checks whether the home location register HLR 6 has sent a notification (SMS-Alert) concerning the reachability of the subscriber (block 115). If the user terminal UT 1 has returned to the network, the MPCA service will be terminated. If the user terminal UT 1 has not registered in the network, the service centre MPCA-SC 11 will supply the MPCA message for retransmission.

Signalling associated with the series of functions is illustrated in FIG. 6. Step 1 of FIG. 6 corresponds to block 10 of FIG. 5, i.e. the earth station SES 3 notifies the switching centre S-MSC 4 that the subscriber has not been reached, i.e. that the paging has failed. The switching centre S-MSC 4 checks the subscriber's authorization to use the paging service, and if the subscriber has access to the service, the switching centre S-MSC 4 reports the activation of the paging service to the gateway MSC 9 (step 2). The GMSC 9 sets a Message Waiting Data flag (e.g. MAP/C SetMessageWaitingData) containing the address of the paging centre in the home location register HLR 5 (step 3), and the flag makes the home location register HLR 5 notify the GMSC 9 that the subscriber has registered in the network (e.g. MAP/C AlertServiceCentre) (step 12). The switching centre S-MSC 4 also reports the failing of the paging in the above manner to the paging centre MPCA-SC 11 (step 4). After receiving the notification, the paging centre MPCA-SC 11 issues a paging message and sends it to the S-MSC 4 (step 5). The switching centre S-MSC 4 conducts a routing inquiry (step 6), adds routing information to the paging message and sends the message to the earth station SES 3 (step 7). The earth station SES 3 times and routes the message to the satellite system and transmits the message to the user terminal UT (step 8).

The user terminal UT 1, which in the shadow region listens to a channel allocated for MPCA transmission, receives the message and sends an acknowledgement e.g. on a channel correspondingly allocated for acknowledgements. For an acknowledgement from the user terminal UT 1, it is possible to provide the equipment with an arrangement described above so as to improve the penetration capacity, or it is possible to define that an acknowledgement is not sent until the subscriber has moved away from the shadow region. The channel arrangement and power level of transmission associated with the acknowledgement are specific for each application. Acknowledgement data transmitted by the user terminal UT 1, i.e. the acknowledgement (MPCA-ACK) of the user terminal or information indicating that the user terminal has not sent an acknowledgement within a predefined period of time is transmitted to the paging centre MPCA-SC 11 (step 11).

The above alternatives describe, by way of an example, some possible applications of the system, but it will be obvious to a person skilled in the art that they can be modified and combined within the scope of the claims. In future solutions, it will also be possible to forward short messages to subscribers via a GPRS network, whereby the functionality associated with the switching centre described in connection with the invention is implemented in the serving support node (SGSN) of the GPRS system.

Even though the invention is described above with reference to a satellite mobile switching centre and names based on PLMN network architecture, the service can be implemented in any telecommunications system whatsoever that is based on a radio connection, including various closed and open mobile systems, paging systems, and packet systems. The drawings and the description associated with them are intended only to illustrate the idea of the invention. The solutions of the invention, however, can vary in their details within the scope of the claims.

What is claimed is:

1. An arrangement for transmitting a message to a user terminal located in a shadow region in a telecommunication system based on a radio connection, comprising:

at least one high penetration paging channel, the penetration capacity, of a transmission on the channel being arranged to be essentially higher than on the other channels of the telecommunications system;

means, responsive to a failed attempt to reach the user terminal on a normal paging channel of the telecommunication system, for transmitting a short message to the user terminal; and means, responsive to a failed attempt to send a short message to the user terminal, for checking if the user terminal is authorized to use high penetration paging and for transmitting a message with high penetration capacity on said at least one high penetration paging channel to the user terminal if the user terminal is authorized to use the high penetration paging.

2. An arrangement according to claim 1, wherein the means for issuing and transmitting a message with high penetration capacity are arranged to repeat the transmission of the high penetration message until an acknowledgement is received from the user terminal or a notification from the telecommunications system indicating that the subscriber can be reached on normal channels.

3. An arrangement according to claim 1 or 2, wherein a switching center in the telecommunications system is arranged to trigger the means for issuing and transmitting a message with high penetration capacity to transmit the high penetration message in response to a failed paging attempt to send a short message to the user terminal.

4. An arrangement according to claim 1, 2 or 3, wherein
   the means for issuing and transmitting a message with high penetration capacity are connected to the switching center of the telecommunications system and are arranged to transmit a high penetration message to said switching center, and
   the switching center is arranged to inquire the location data of the subscriber from the subscriber database of the telecommunications system and to route the high penetration message to the part of the telecommunications system indicated by said subscriber data for further transmission on said at least one high penetration paging channel.

5. An arrangement according to claim 1, 2, 3 or 4, wherein the means for issuing and transmitting a message with high penetration capacity are arranged to send the high penetration message simultaneously to a group of user terminals comprising at least two terminals.

6. A method of transmitting a message to a user terminal located in a shadow region in a telecommunications system based on a radio connection, comprising:

paging the user terminal on a normal paging channel of the telecommunications system;

sending a short message to the user terminal in response to an unsuccessful paging attempt; and in response to an unsuccessful short message transmission, checking if the user terminal is authorized to use high penetration paging and sending a high penetration message to the user terminal on at least on high penetration paging channel, the penetration capacity on the channel being much higher than on the other channels of the telecommunications system if the user terminal is authorized to use the high penetration paging.

7. A method according to claim 6, wherein the transmission of the high penetration message is repeated until an acknowledgement is received from the user terminal or a notification is received from the telecommunications system indicating that the subscriber can be reached on normal channels.

8. A method according to claim 7, further comprising:

setting a notification in the subscriber database of the telecommunications system about an on-going transmission of a high penetration message;

receiving at the subscriber database, the notification indicating that the subscriber can again be reached on a normal paging channel;

transmitting the reachability notification from the subscriber database to equipment controlling the transmission of the high penetration message; and terminating the transmission of the high pentration message in response to the reachability notification.

9. A method according to any one of claims 6 to 8, wherein a high penetration paging message is transmitted simultaneously to a group of user terminals comprising at least two terminals.

* * * * *